Oct. 23, 1934.  J. H. SLAKER  1,977,836
DUMP CAR
Filed Nov. 7, 1925  2 Sheets-Sheet 1
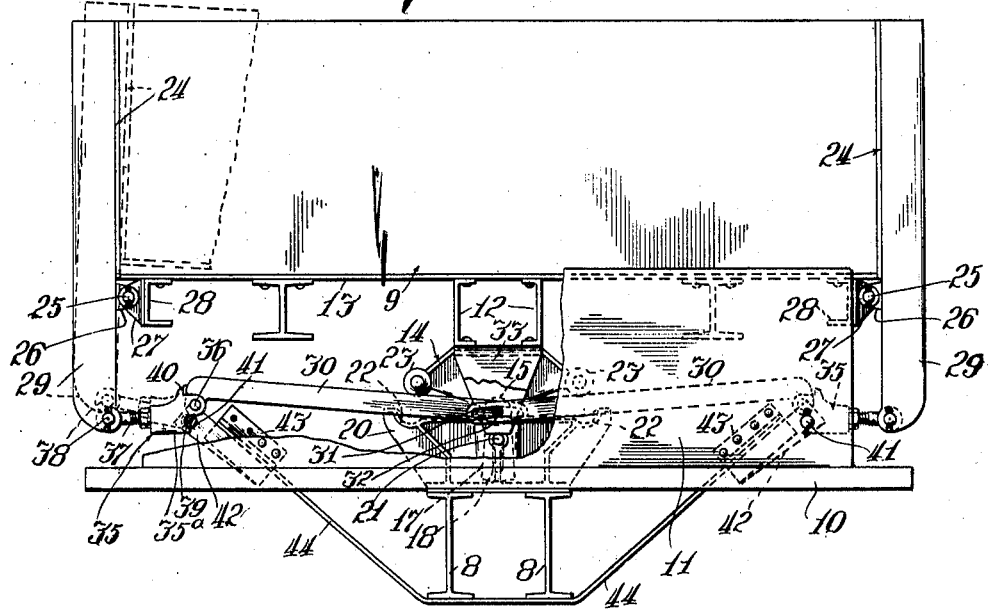
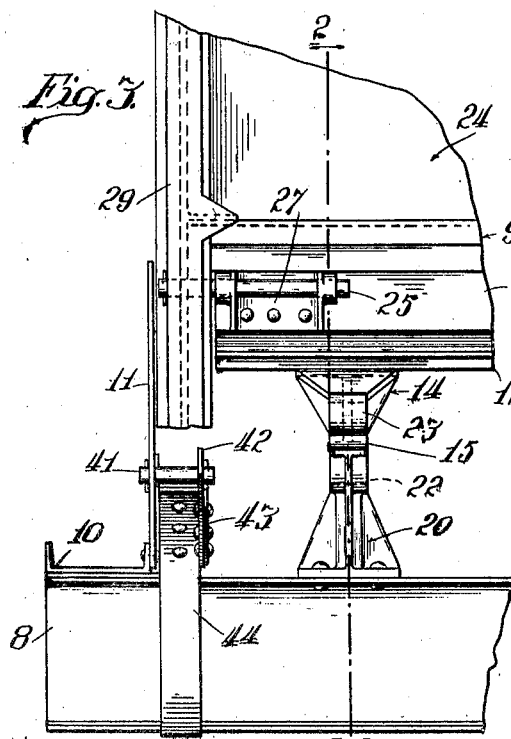
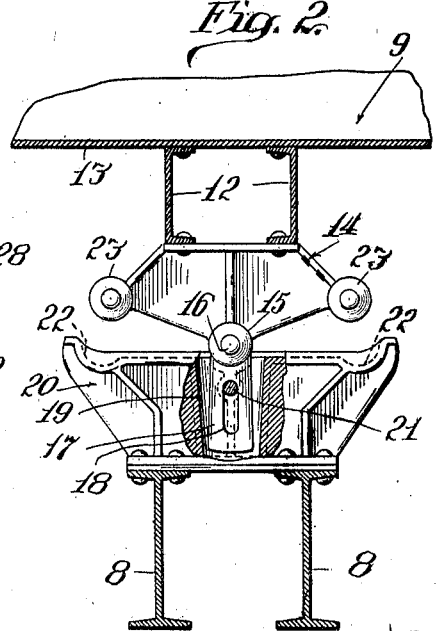

Oct. 23, 1934.  J. H. SLAKER  1,977,836
DUMP CAR
Filed Nov. 7, 1925   2 Sheets-Sheet 2
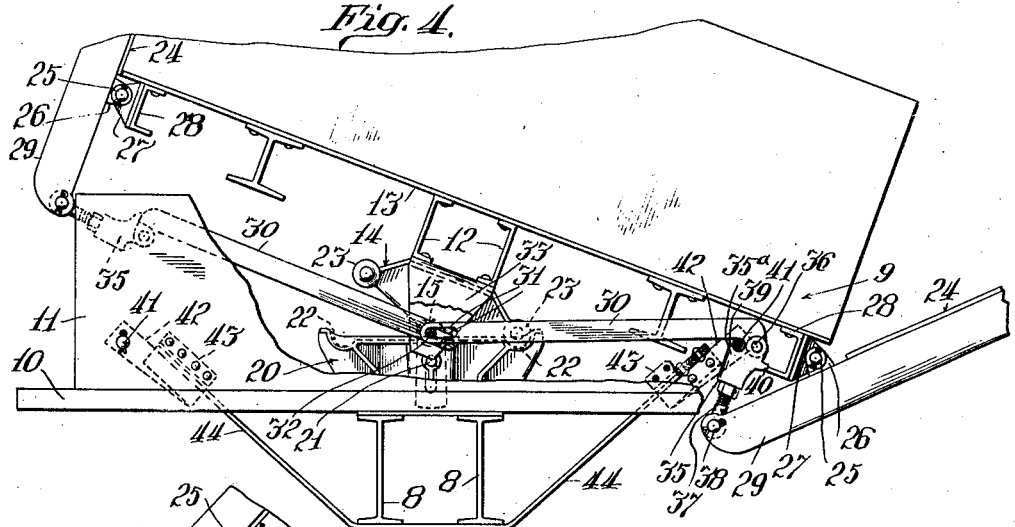
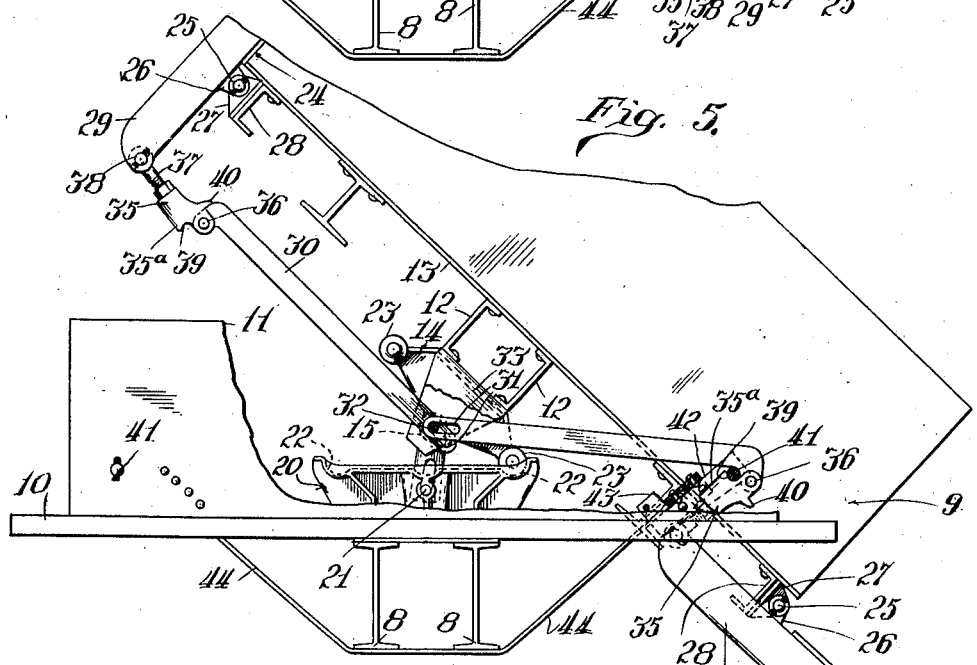
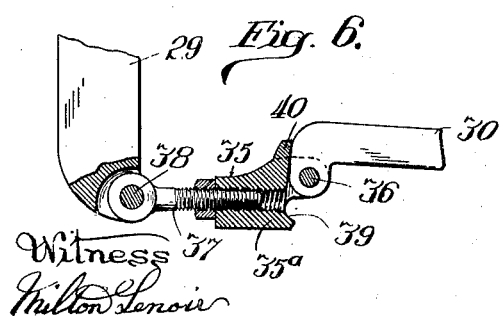
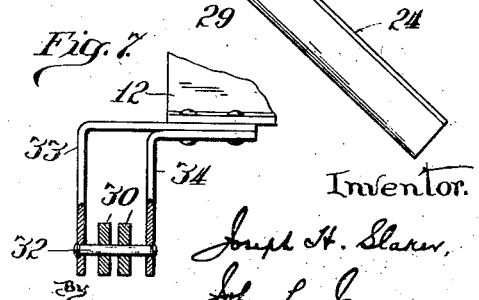

Patented Oct. 23, 1934

1,977,836

UNITED STATES PATENT OFFICE 1,977,836

DUMP CAR

Joseph H. Slaker, Aurora, Ill., assignor, by mesne assignments, to Western-Austin Company, Aurora, Ill., a corporation of Illinois Application November 7, 1925, Serial No. 67,523

58 Claims. (Cl. 105—276)

My invention relates to dump cars of the type in which the load carrying body or bed of the car is tiltably mounted on the underframe of the car in order to dump the load laterally to either side of the car, and in which this load carrying body or bed is provided with side gates or doors mounted to swing outward and downward to a position approximately level with or slightly below the bottom or floor of the bed to for a lateral extension thereof, thereby serving as a chute to direct the load out away from the car, so that it will not be deposited on the road bed. Dump cars having this arrangement of side gates or doors are frequently referred to as drop door cars. More specifically, my invention relates to these drop door cars of the above general description wherein tilting movement of the load carrying bed to dumping position at either side of the car occurs about fulcrums which are spaced laterally from the longitudinal center line of the car. The provision of the laterally spaced fulcrums avoids the severe dumping shock which is an objectionable characteristic of drop door cars wherein the entire tilting movement of the bed occurs around a centrally disposed hinge or pivot axis. In such latter type of center hinge cars, the outward and downward folding movement of the gate or door at the dumping side causes the weight of the door to add to the unbalanced condition of the bed, and to this is still further added the weight of the load pressing outwardly against the downwardly folding door, and sliding outwardly over said door as the bed approaches its final dumping angle, the weight of the door and load tending to cause the bed to drop down with a severe dumping shock in the center hinge type of car. The provision of the laterally spaced fulcrums in the car herein disclosed avoids this dumping shock, and results in other advantages which will hereinafter appear.

The general object of the present invention is to provide an improved dump car of the above general description, characterized particularly by the provision of improved controlling mechanism for controlling or actuating the side gates. This mechanism operates to hold the gates effectively closed when the bed is in its normal or horizontal position, and, in the dumping operation, permits the gate at the dumping side to swing outwardly and downwardly to a position substantially in prolongation of the floor of the bed, while maintaining the gate at the opposite side in its closed position. Other objects and advantages of my invention will appear from the following detail description and accompanying drawings disclosing one preferred embodiment of my invention.

In the accompanying drawings,—

Fig. 1 is an end view of a car embodying my improvements, certain parts being broken away, and the running gear being omitted;

Fig. 2 is a vertical cross-section on line 2—2 of Fig. 3, illustrating the means for supporting the car bed so that the load may be dumped at either side;

Fig. 3 is a detail, being a partial side elevation of one end portion of the car;

Figs. 4 and 5 are partial end views showing the position of the parts at different stages of the dumping operation;

Fig. 6 is a detail, partly in section, of parts of the operating mechanism for the gates; and Fig. 7 is a detail illustrating the means for supporting the inner ends of the links through which the operation of the gates is in part controlled.

The car bed, and the under body or under frame that supports it, may be of any approved construction.

In the preferred embodiment of my invention the supporting arrangements which enables the bed to tilt laterally to dumping position at either side of the car includes the aforementioned laterally spaced fulcrums, and, accordingly, in the accompanying drawings I have illustrated my improvements embodied in a construction having such laterally spaced fulcrums. However, certain aspects of my invention are not essentially limited to this construction.

Referring now to the drawings, which illustrate one of various ways in which my improvements may be embodied in practical form, 8 indicates two longitudinally disposed I-beams which constitute the center sill of the under body or under frame of the car. This center sill is mounted on trucks in the usual way and supports the car bed or body 9. Transversely disposed channel bars 10 are provided at the end portions of the center sill, and from the inner flanges of said channel bars rise transversely disposed plates 11, one at each end of the car, which plates serve as supports for certain parts to be hereinafter described.

The car bed also is provided with a center sill 12, preferably composed of oppositely disposed channel beams, as shown in Figs. 1 and 2, the upper margins of which are secured to the bottom of the floor 13 of the car bed, while their lower margins have secured to them at suitable intervals a series of upper fulcrum brackets 14, preferably of the design best shown in Fig. 2. Each of the upper fulcrum brackets 14 has a center fulcrum 15 adapted to receive a pivot 16, which pivot is carried at the upper end of an upright bar 17 having a longitudinal slot 18, as best shown in Fig. 2. The bar 17 is adapted to fit in an upwardly flared socket 19 in the associated one of a series of lower fulcrum brackets 20 which are secured to the upper margins of the I-beams 8 and are disposed transversely thereof. A pin 21 secured to the bracket 20 and extending through the slot 18 serves to prevent the bar 17 from being lifted out of the socket 19, but permits it to move vertically to a limited extent. The lower fulcrum bracket 20 is provided near its ends with recesses 22 in its upper surface, which constitute laterally spaced fulcrum supports on the underframe. These are adapted to receive rollers or knobs 23 carried by the upper fulcrum bracket 14, which constitute laterally spaced fulcrums on the bed 9. The arrangement is such that when the bed tilts in one direction or the other, one or the other of said upper fulcrum rollers will move down into the corresponding upper fulcrum recess 22 to form a laterally displaced pivotal support for the car bed about which it may continue to pivot or tilt in the same direction. When this occurs, as shown in Fig. 5 the bar 17 will be moved up in the socket 19 to an extent limited by the length of the slot 18. By this construction the car bed is shifted laterally to some extent in the dumping operation, permitting the load to be thrown out further to one side than it would be if the bed were mounted upon a fixed center pivot. Also, the tilting movement to final dumping position about the fulcrums 22, 23 occur without objectionable shock by reason of the spacing of these fulcrums outwardly from the center line of the car.

The car bed is provided with side gates or doors 24 which are pivotally connected thereto adjacent to the floor 13, preferably by means of pivots 25 which are fitted in lugs 26 projecting inwardly from the side gates slightly below the level of the floor 13, and extend through lugs 27 secured to and projecting outwardly from channel bars 28, which are disposed under and support the marginal portions of the floor 13, as shown in Fig. 1. The pivots 25 are so placed that when the gates are in vertical position they effect a substantial closure against the side edges of the floor and ends of the car, as shown in Fig. 1, and when the bed is tilted to its dumping position, the gate at the dumping side will form a lateral extension of the floor 13, preferably on a slightly lower level, as best shown in Fig. 5. The gate at the opposite side will remain in its closed position when the car is dumped, as also shown in said figure.

For controlling the operation of the gates, each of said gates is provided at its ends with bars 29 that extend down below the lower margin thereof and are connected with toggle mechanism comprising transversely disposed links 30 mounted at the ends of the car to swing vertically. Said links are provided with slots 31 at their inner ends which ride on pins 32 carried by downwardly extending plates 33, 34 that depend from the end portions of the channel beams 12 carried by the bed 9. It will be understood that two of the links 30 are provided at each end of the car, and that they extend in opposite directions from the pins 32. This pivotal mounting of the inner ends of the links 30 may, if desired, be directly upon the under body. The outer end of each of the links 30 is connected with the adjacent bar 29 by means of a thrust member 35 which forms a part of the toggle mechanism and comprises a head 35$^a$ pivotally connected to the link by a pivot 36, and an eyebolt 37 screwed into the head 35$^a$ and pivotally connected with the bar 29 by a pivot 38, as best shown in Fig. 6. Adjacent to the pivot 36 the head 35$^a$ is provided with a concave seat 39 which serves as a rocker bearing, as will be hereinafter described, and at the opposite side of the head from the seat 39 it is provided with a shoulder 40 which is adapted under certain conditions to bear against the adjacent end of the link 30 above the pivot 36. When the parts are in their normal position, shown in Fig. 1, said shoulder lies a short distance away from the adjacent end of the link 30. By this construction I provide a knuckle joint connection between the toggle members which is adapted to break in an upward direction, but prevents said members from moving downward beyond a position of approximate alinement.

When the car bed is in its horizontal position, the side gates occupy a vertical position, closing the sides of the bed, as illustrated in Fig. 1, and at that time the links 30 and the thrust members 35 connecting them with the lower ends of the bars 29 occupy an approximately horizontal position with the shoulders 40 out of contact with said links, these parts being supported in such position by means of pivotal supports in the form of pins 41 disposed longitudinally of the car and supported by the plates 11, as best shown in Fig. 3. Preferably the pins 41 are further supported by short plates 42 secured to angle brackets 43 connected to braces 44 which form a part of the under body of the car. The precise manner in which the pins 41 are supported is, however, immaterial, as any suitable means by which they will be held firmly in position may be employed. Said pins or pivotal supports cooperate with the thrust members 35 to hold the gates closed when the car bed is in its normal position, and at that time break the knuckle joints slightly to permit the gate at the dumping side to drop when the bed is tilted, as will now be described.

By reference to Fig. 1, it will be seen that when the bed is in its horizontal position the pins 41 at opposite sides of the car will rest in the bearings 39 in the heads 35$^a$, thereby supporting the outer ends of the links 30 and the inner ends of the thrust members 35. At this time said pins are substantially in alinement with the longitudinal axes of said thrust members and consequently hold the gates tightly closed. Assuming now that the bed be tilted to the right, as the right-hand margin of the bed descends the lower ends of the bars 29 at that side will be caused to move down, swinging the thrust members 35 at that side down about the pins 41, as shown in Fig. 4. This will cause the gate at the right-hand side to swing outward and downward about its pivots 25, until finally, when the bed has been fully tilted, such gate will assume a position substantially parallel with the floor of the car and extending outwardly beyond the lower margin thereof, as shown in Fig. 5. The swinging of the thrust members 35 carries the outer ends of the links 30 over the pins 41, so that they are supported thereby, the necessary outward movement of the links being permitted by the slots 31. When the bed is righted, the operation is reversed and the side gate is restored to its operative position.

During the dumping operation the side gate at the upper side of the bed remains in its operative position and is locked in such position, because when that side of the bed swings upward the thrust members at that side swing up with it, and as soon as the upward movement has gone far enough to cause the shoulders 40 to engage the outer ends of the links 30 the toggle mechanism is moved out of engagement with the pins 41. When such engagement takes place, the thrust members 35 will have rocked far enough about the pivots 36 to carry said pivots downwardly across a line intersecting the pivots 38 and 32, thereby forming a past center lock which prevents the toggle from breaking. This of course prevents the gate at the upper side of the bed from opening, which condition obtains until the car bed is restored to its normal position. When the bed is righted, the thrust members 35 again engage the pins 41, which breaks the past center lock, so that the gate is in readiness to be opened on the tilting of the bed in appropriate direction.

From the foregoing description it will be seen that the gates are always locked when the bed is in its horizontal position, and that when the bed is tilted only the gate at the dumping side is unlocked, and it is swung down gradually as the bed tilts until finally it forms an approximately level lateral extension of the floor. It will also be seen that when the bed is righted the latter gate is restored to its operative position and is automatically locked in such position. The adjustable connection of the eye-bolt 37 with the head 35ª provides for adjusting the effective length of the thrust member 35 to compensate for wear and insure proper closure of the gates.

It will be seen from the foregoing that when the bed is swinging through the latter portion of its tilting movement, toward and into its final dumping angle, it is tilting about a pivot axis defined by the fulcrums 22, 23 which, by reason of its outward spacing from the center line of the car, prevents the bed from completing its movement with a severe dumping shock. This avoidance of objectionable dumping shock makes the use of the laterally spaced fulcrums 22, 23 a desired or preferred construction, but my invention is not essentially limited to that construction. It will be evident that any suitable means may be employed for tilting the bed and righting it, such as compressed air operating mechanism, which is old and well known. In cars in which the car bed is mounted to rock about center pivots, as in the form illustrated, any suitable locking means may be provided for holding the bed against tilting while rounding curves, or while being loaded, such, for example, as that shown in Letters Patent No. 1,509,113, granted to me September 23, 1924. Such locking means is, of course, unnecessary where the bed is mounted to tilt about bearings at opposite sides of the car, and therefore is normally stable. Also I wish it to be understood that my invention as defined in the claims hereinafter made, is not limited to the specific construction shown and described, as various modifications thereof comprehended within the scope of the claims will readily occur to those familiar with the art. For example, the degree of lateral spacing of the fulcrums 22, 23 may be made greater or less as desired, and the degree of vertical spacing between each fulcrum 23 and its fulcrum support 22, with the bed horizontal, may be made greater or less as desired.

What I claim as my invention and desire to secure by Letters Patent, is—

1. A dump car comprising an under frame, a bed adapted to tilt about laterally spaced fulcrums relative to said under frame, a side gate for said bed mounted to swing outward and downward from its closed position, a toggle adapted to hold the gate closed when the bed is tilted in one direction, and means on the under frame operating to break said toggle to permit the gate to open upon tilting of the bed in the opposite direction.

2. A dump car comprising an underframe, a bed adapted to tilt about laterally spaced fulcrums relative to said under frame, a side gate for said bed mounted to swing outward and downward from its closed position, a toggle adapted to hold the gate closed, and a pivotal support mounted on the under frame and operating to break said toggle to permit the gate to open upon the tilting of the bed to discharge its load.

3. A dump car comprising an underframe, a bed adapted to tilt in either direction from its normal position, laterally spaced fulcrums fixedly secured to said bed, laterally spaced fulcrum supports fixedly secured to said under frame and engaged by said fulcrums, side gates for said bed mounted to swing outward and downward from their closed position, toggles adapted to hold said gates closed, and means operating to break said toggles to permit the gate at the dumping side to open upon the tilting of the bed to discharge its load at either side of the car.

4. A dump car comprising a bed adapted to tilt laterally in either direction from its normal position, an under body on which said bed is supported, side gates for said bed mounted to swing outward and downward from their closed position, toggles adapted to hold said gates closed when they are moved upward from their normal position, means mounted on the under body at opposite sides of the car and independent of the toggles, operating to break said toggles to permit the gate at the dumping side to open upon the tilting of the bed in either direction.

5. A dump car comprising a bed adapted to tilt laterally in either direction from its normal position, an under body on which said bed is supported, side gates for said bed mounted to swing outward and downward from their closed position, toggles adapted to hold said gates closed, and means operating to break said toggles to permit the gate at the dumping side to open upon the tilting of the bed to discharge its load at either side of the car, said toggles being arranged to swing upward from their normal position independently of said toggle breaking means.

6. A dump car comprising a bed adapted to tilt laterally in either direction from its normal position, an under body on which said bed is supported, side gate for said bed mounted to swing outward and downward from their closed position, toggles adapted to hold said gates closed when they are moved upward from their normal position, and means mounted on the under body at opposite sides of the car and operating to break said toggles and to hold the gates closed when they are in their normal position.

7. A dump car comprising a bed adapted to tilt laterally in either direction from its normal position, an under body on which said bed is supported, side gates for said bed mounted to swing outward and downward from their closed position, toggles adapted to hold said gates closed when they are moved upward from their normal position, and means mounted on the under body at opposite sides of the car and operating to break said toggles and to hold the gates closed when they are in their normal position, said toggles being arranged to swing upward with the bed independently of said means.

8. A dump car comprising a bed adapted to tilt laterally in either direction, an under body on which said bed is supported, a side gate mounted on said bed to swing outward and downward from its closed position, a pivotal support mounted on the under body, a thrust member pivotally connected with the gate to swing vertically relatively thereto and arranged to bear against said pivotal support to hold the gate closed when the bed is in its normal position, and to rock about said pivotal support to permit the gate to open when it is moved downward from its normal position by the tilting of the bed, and means cooperating with said thrust member to hold the gate closed when the bed is tilted in the opposite direction.

9. A dump car comprising a bed adapted to tilt laterally in either direction, an under body on which said bed is supported, a side gate mounted on said bed to swing outward and downward from its closed position, a pivotal support mounted on the under body, a thrust member pivotally connected with the gate to swing vertically relatively thereto and arranged to bear against said pivotal support to hold the gate closed when the bed is in its normal position, and to rock about said pivotal support to permit the gate to open when it is moved downward from its normal position by the tilting of the bed, and vertically swinging means for holding said thrust member in operative relation to said pivotal support during downward movement of the gate, and for holding the gate shut when the bed is tilted in the opposite direction.

10. A dump car comprising a tilting bed, an under body on which said bed is supported, a side gate mounted on said bed to swing outward and downward from its closed position, a pivotal support mounted on the under body at one side thereof, a thrust member pivotally connected with the gate to swing vertically relatively thereto and arranged to bear against and rock about said pivotal support to permit the gate to open while it is moved downward from its normal position by the tilting of the bed, and vertically swinging means for holding said thrust member in operative relation to said pivotal support during the movement of the gate, said thrust member and holding means being arranged to swing upward with the bed independently of said pivotal support when the bed is dumped at the opposite side.

11. A dump car comprising a bed adapted to tilt laterally in either direction, an under body on which said bed is supported, a side gate mounted on said bed to swing outward and downward from its closed position, a pivotal support mounted on the under body, a thrust member pivotally connected with the gate to swing vertically relatively thereto and arranged to bear against said pivotal support to hold the gate closed when the bed is in its normal position, and to rock about said pivotal support to permit the gate to open when it is moved downward from its normal position by the tilting of the bed, and a vertically swinging link pivotally connected with the car and with said thrust member and operating to hold the same in operative relation to said pivotal support during downward movement of the gate, and cooperating with said thrust member to form a toggle lock to hold the gate shut when the bed is tilted in the opposite direction.

12. A dump car comprising a tilting bed, an under body on which said bed is supported, a side gate mounted on said bed to swing outward and downward from its closed position, a pivotal support mounted on the under body at one side thereof, a thrust member pivotally connected with the gate to swing vertically relatively thereto and arranged to bear against and rock about said pivotal support to permit the gate to open when it is moved downward from its normal position by the tilting of the bed, and a vertically swinging link having a knuckle joint connection with said thrust member for holding the same in operative relation to said pivotal support during the movement of the gate, and locking the gate in its closed position when the bed is tilted in the opposite direction.

13. A dump car comprising a tilting bed, an under body on which said bed is supported, a side gate for said bed mounted to swing outward and downward from its closed position, a thrust member pivotally connected with the gate to swing vertically relatively thereto, a link pivotally connected with said thrust member by a knuckle joint adapted to break upwardly, and a pivotal support mounted on the under body adjacent to said knuckle joint, said thrust member being arranged to bear against said pivotal support when the bed is in its normal position and to swing about said support during the opening or closing of the gate.

14. A dump car comprising a tilting bed, an under body on which said bed is supported, a side gate for said bed mounted to swing outward and downward from its closed position, a thrust member pivotally connected with the gate to swing vertically relatively thereto, a link pivotally connected with said thrust member by a knuckle joint adapted to break upwardly, and a pivotal support mounted on the under body adjacent to said knuckle joint, said thrust member being arranged to bear against said pivotal support when the bed is in its normal position and to swing about said support during the opening or closing of the gate, said link and thrust member being movable upward independently of said pivotal support when the bed is tilted in the opposite direction.

15. A dump car comprising a tilting bed, an under body on which said bed is supported, a side gate for said bed mounted to swing outward and downward from its closed position, a thrust member pivotally connected with the gate to swing vertically relatively thereto, a transversely disposed link pivotally connected at its inner end directly with the bed and having a knuckle joint connection at its outer end with said thrust member, and means carried by the under body for breaking said joint.

16. A dump car comprising a tilting bed, an under body on which said bed is supported, a side gate for said bed mounted to swing outward and downward from its closed position, a thrust member pivotally connected with the gate to swing vertically relatively thereto, a transversely disposed link pivotally connected at its inner end with said bed and having a knuckle joint connection at its outer end with said thrust member, and a pivotal support for said thrust member mounted on the under body in substantial alinement with the longitudinal axis of said thrust member.

17. A dump car comprising an underframe, a load carrying bed supported thereon and adapted to tilt selectively to dumping position at either side of the car, laterally spaced fulcrums fixedly secured to said bed and laterally spaced fulcrum supports stationarily secured to said underframe defining at the dumping side of the car a stationary fulcrum axis around which the latter portion of the dumping movement of the bed occurs, side gates connected with opposite sides of the bed and adapted to swing outwardly and downwardly to open position, a separate gate controlling mechanism for each gate supported solely on said bed and completely separable from said underframe, each of said gate controlling mechanisms comprising a locking member, and locking devices mounted on said underframe for each of said locking members, each of said locking members being automatically disengageable from and reengageable with its associated locking device in the dumping and righting operations of the car, the locking member of the gate controlling mechanism at the dumping side of the bed remaining in engagement with its associated locking device during the dumping and righting operations for enabling the gate at the dumping side to open and for causing it to close, and the locking member of the gate controlling mechanism at the opposite side of the bed separating automatically from its associated locking device in the dumping operation for swinging upwardly with the bed to hold the gate at the rising side closed during dumping and reengaging automatically with said locking device in the righting operation for holding the gate closed during transport.

18. A dump car comprising a bed adapted to tilt laterally in either direction, an under body on which said bed is supported, a side gate mounted on said bed to swing outward and downward from its closed position, a fixed pivotal support mounted on the under body at one side thereof, a thrust member pivotally connected with the gate to swing vertically relatively thereto and arranged to bear against and rock about said pivotal support to permit the gate to open when it is moved downward from its normal position by the tilting of the bed, and a vertically swinging link pivotally connected at its inner end with the bed and at its outer end with the thrust member and operating to hold the same in operative relation to said pivotal support during downward movement of the gate, and to hold the gate closed when the bed is tilted in the opposite directions from its normal position.

19. A dump car comprising an underframe, a load carrying bed supported thereon and adapted to tilt selectively to dumping position at either side of the car, laterally spaced fulcrums mounted on said bed, laterally spaced fulcrum supports mounted on said underframe and coacting with said fulcrums to define stationary fulcrum axes around which said bed is adapted to tilt, side gates hingedly connected with opposite sides of the bed and adapted to swing outwardly and downwardly to open position, each of said gates having an arm extending downwardly therefrom below the hinge axis of the gate, a separate gate controlling mechanism for each gate supported solely on said bed, completely separable from said underframe, and coacting with said arm, each of said gate controlling mechanisms comprising a locking member, and locking devices mounted on said underframe for each of said locking members, each of said locking members being automatically disengageable from and reengageable with its associated locking device in the dumping and righting operations of the car.

20. A dump car comprising a tilting bed, an under body on which said bed is supported, a side gate mounted on said bed to swing outward and downward from its closed position, a fixed pivotal support mounted on the under body at one side thereof, and a longitudinally adjustable thrust member pivotally connected with the gate to swing vertically relatively thereto and arranged to bear against said pivotal support to hold the gate closed when the bed is in its normal position, and to rock about said pivotal support to permit the gate to open when it is moved downward from its normal position by the tilting of the bed.

21. A dump car comprising a tilting bed, an under body on which said bed is supported, a side gate mounted on said bed to swing outward and downward from its closed position, a pivotal support mounted on the under body at one side thereof, a longitudinally adjustable thrust member pivotally connected with the gate to swing vertically relatively thereto and arranged to bear against and rock about said pivotal support to permit the gate to open when it is moved downward from its normal position by the tilting of the bed, and vertically swinging means for holding said thrust member in operative relation to said pivotal support during the movement of the gate.

22. A dump car comprising a tilting bed, an under body on which said bed is supported, a side gate for said bed mounted to swing outward and downward from its closed position, a toggle adapted to hold the gate closed, one of the members of the toggle being adjustable to vary the effective length thereof, and means operating to break said toggle to permit the gate to open upon the tilting of the bed to discharge its load.

23. A dump car comprising an underframe, a bed adapted to tilt in either direction about laterally spaced fulcrums relative to said underframe, a side gate mounted on said bed to swing outward and downward from its closed position, a thrust member pivotally connected with the gate to swing vertically, means cooperating with said thrust member to hold the gate closed when the bed is in its normal position and to permit the gate to open when the bed is tilted in one direction, and means cooperating with said thrust member to hold the gate closed when the bed is tilted in the opposite direction.

24. A dump car comprising a bed to tilt laterally in either direction, an under body on which said bed is supported, a side gate mounted on said bed to swing outward and downward from its closed position, a thrust member pivotally connected with the gate to swing vertically, fixed means mounted on the car and cooperating with said thrust member to hold the gate closed when the bed is in its normal position and to permit the gate to open when the bed is tilted in one direction, and means cooperating with said thrust member to hold the gate closed when the bed is tilted in the opposite direction.

25. A dump car comprising a tilting bed, an under body on which said bed is supported, a side gate mounted on said bed to swing outward and downward from its closed position, a thrust member pivotally connected with the gate to swing vertically relatively thereto, said thrust member being adjustable to vary the effective length thereof, and means cooperating with said thrust member to hold the gate closed when the bed is in its normal position and to permit the gate to open when the bed is tilted in one direction.

26. In a dump vehicle having an under frame and a body tiltable about laterally spaced fulcrums relative to said under frame, a lost motion link connection for limiting the tilting of the body with respect to the said fulcrums, a door at each side of said body and pivotally supported thereby, and door controlling devices for each of said doors having connections with said body.

27. In a dump car, the combination of an under frame, laterally spaced fulcrum supports mounted in fixed relation on said under frame, a tilting body, laterally spaced fulcrums mounted in fixed relation on said body and adapted to cooperate with said fulcrum supports in the tilting movement of the body to dumping position at either side of the car, a door at each side of said body and pivotally supported thereby to swing outward and downward from its closed position, and door controlling means comprising toggles connected with said doors and with said body.

28. In a dump vehicle having an under frame and a body tiltable about cooperating pairs of fulcrum members mounted in fixed relation on said body and on said under frame and arranged to engage with each other, said pairs of fulcrum members being spaced transversely with respect to the center line of the car, doors at each side of said body supported thereby to swing outward and downward from their closed position, toggles adapted to hold said doors closed, and means effective to release said toggles to permit the door at the dumping side to open upon the tilting of the body to discharge its load at either side of the vehicle.

29. In a dump vehicle having an under frame and a body adapted to tilt laterally in either direction from its normal position, laterally spaced fulcrum supports fixedly secured to said under frame, laterally spaced fulcrums arranged to engage therewith and fixedly secured to said body, a door pivotally supported at each side of said body to swing outward and downward from its closed position, and door controlling means comprising toggles connected only to said doors and to said body.

30. In a dump vehicle having an under frame and a body adapted to tilt laterally in either direction from its normal position, laterally spaced fulcrum supports fixedly secured to said under frame, fulcrums arranged to engage therewith and mounted in fixed laterally spaced relation on said body, doors at each side of said body pivotally connected adjacent to their lower edges to said body to swing outward and downward from their closed position, an arm on each door extending downwardly below the pivot of said door when the body is in its normal position, relatively short links pivotally connected to the lower portions of each of said arms, and relatively long links pivotally connected to said relatively short links and also pivotally connected to said body.

31. A dump car comprising an under frame, a tilting bed mounted on said under frame and adapted to rock to dumping position about rocking fulcrums spaced laterally from the center of said under frame, side gates connected with opposite sides of the bed to swing downwardly into open position, and gate operating mechanism comprising outer links operatively connected with each of said gates, inner links pivotally connected at their outer ends with said outer links and pivotally connected at their inner ends with the car, and cooperating stop shoulders carried by said outer and inner links for limiting the relative pivotal movement between said links in one direction.

32. A dump car comprising an under frame, a tilting bed mounted on said under frame and adapted to rock to dumping position about two rocking fulcrums spaced laterally from the center of said bed and fixedly secured thereto, side gates connected with opposite sides of the bed to swing downwardly into open position, and gate operating mechanism comprising outer links operatively connected with each of said gates, inner links mounted at their inner ends on the car and pivotally connected at their outer ends with said outer links, and stop means for limiting the relative pivotal movement between said links in one direction.

33. A dump car comprising an under frame, a bed adapted to tilt in either direction about laterally spaced fulcrums relative to said under frame, side gates connected with opposite sides of the bed to swing downwardly into open position, and gate operating mechanism for each gate comprising an outer link operatively connected with its associated gate, an inner link pivotally connected at one end to said outer link, pin and slot lost-motion means supporting the other end of said inner link, and stop means for limiting the relative pivotal movement between said links in one direction.

34. A dump car comprising an under frame, a tilting bed mounted on said under frame for lateral dumping movement in either direction, a plurality of laterally spaced fulcrum supports fixedly secured to said under frame and on which said bed is adapted to tilt, laterally spaced fulcrums fixedly secured to said bed and adapted to engage with said fulcrum supports, side gates connected with opposite sides of the bed to swing downwardly into open position, and gate operating mechanism for each gate comprising an outer link operatively connected with its associated gate, an inner link pivotally connected at one end to said outer link, means pivotally supporting the other end of said inner link on an axis in proximity to the axis of one of said fulcrum members, and stop means for limiting the relative pivotal movement between said links in one direction.

35. A dump car comprising an under frame, a bed adapted to tilt in either direction about laterally spaced fulcrums relative to said under frame, side gates connected with opposite sides of the bed to swing downwardly into open position, and gate operating mechanism for each gate comprising an outer link operatively connected with its associated gate, an inner link pivotally connected at one end to said outer link, means pivotally supporting the other end of said inner link at a point maintained in fixed spaced relation from either of said laterally spaced fulcrums, and stop means for limiting the relative pivotal movement between said links in one direction.

36. A dump car comprising an underframe, a tilting bed adapted to rock to dumping position at opposite sides of the car, fulcrum members mounted in fixed positions on said bed spaced laterally from the longitudinal medial plane of the bed, laterally spaced fulcrum supports fixedly mounted on said underframe and on which said fulcrum members rock in the dumping operation, side gates connected with opposite sides of the bed to swing downwardly into open position, and gate controlling mechanism for each gate supported solely on said bed and completely separable from said under frame, the gate controlling mechanism controlling the gate at the lower side of the tilted bed remaining in engagement with and in substantially fixed relation with said underframe while the mechanism controlling the gate at the other side remains in substantially fixed relation with the bed, so that the gate at the upper side of the bed is maintained closed during dumping.

37. In a dump car, the combination of an underframe, a tilting bed rockable selectively to dumping position at opposite sides of the car, laterally spaced fulcrums on said bed and laterally spaced fulcrum supports on said underframe defining at the dumping side of the car a stationary fulcrum axis around which the latter portion of the dumping movement of the bed occurs, a side gate for said bed pivoted thereto at each side thereof, and gate controlling mechanism for each gate supported solely on said bed and completely separable from said underframe, the gate controlling mechanism controlling the gate at the lower side of the tilted bed maintained in engagement with and in substantially fixed relation with the underframe while the mechanism controlling the gate at the other side remains in substantially fixed relation with the bed, so that the gate at the upper side of the bed is maintained closed during dumping.

38. In a dump car, the combination of an underframe, a tilting bed rockable to dumping position at opposite sides of the car, laterally spaced fulcrums on said bed and laterally spaced fulcrum supports on said underframe defining at the dumping side of the car a stationary fulcrum axis around which the latter portion of the dumping movement of the bed occurs, a side gate for said tilting bed at each side thereof pivotally connected with the bed to swing downwardly into open position, and independent control mechanisms for each gate connected to said tilting bed, completely separable from said underframe and having the major portions thereof extending substantially from one side of the longitudinal medial plane through the underframe to the adjacent gate for independently and selectively moving said respective gates from opened to closed position during the return of said bed from tilted position.

39. In a dump car, the combination of an underframe, a bed adapted to tilt about trunnions on said underframe for dumping to either side, said trunnions being spaced laterally from the longitudinal medial plane of the car, a member connected to said tilting bed, and a side gate for said bed pivotally connected thereto to swing outwardly and downwardly to open position, said member acting on the gate to maintain the same in closed position when the bed is in its normal righted position and when said gate side is elevated, said member being connected solely with the bed, independently of the underframe, and swinging upwardly with said bed when the gate side is elevated, said member adapted to have bearing engagement with the underframe to prevent downward movement of said member with the bed when the gate side of the bed is depressed, whereby the locking co-action between said member and the gate is released.

40. In a dump vehicle, an underframe, a dump body tiltable for dumping at either side of the vehicle about rocking fulcrums spaced laterally from the center of said underframe, downfolding side doors pivoted to said body at each side thereof, gravity held locking means connected with said body and the respective door to hold said door closed while the body has been tilted about the fulcrum on the side opposite said door, and means on the frame to release said holding means when the body turns about the fulcrum at the side adjacent said door.

41. A dump car comprising an underbody, a car bed mounted on said underbody and adapted to rock to dumping position at either side of the car, laterally spaced fulcrums on said bed and laterally spaced fulcrum supports on said underframe defining at the dumping side of the car a stationary fulcrum axis around which the latter portion of the dumping movement of the bed occurs, side gates pivotally connected adjacent to their lower edges to said bed to swing outward and downward from their closed position, and toggle devices supported independently of the underbody, and connected with the bed to swing therewith for holding the gate at the high side closed during dumping.

42. A dump car comprising an under frame, a tilting bed adapted to rock to dumping position to either side of the car about rocking fulcrums spaced laterally from the center of said under frame, side gates pivotally connected adjacent to their lower edges with said bed to swing downwardly into open position, and a gate controlling mechanism for each gate comprising a transverse member, link means pivotally connected with the outer end of each transverse member and operatively associated with the respective gate, said outer end of the transverse member being supported solely by said link means on the rising side of the car in the dumping operation, and means pivotally supporting the opposite end of said transverse member on the car.

43. A dump car comprising an under frame, a tilting bed adapted to rock to dumping position to either side of the car, laterally spaced fulcrums on said bed and laterally spaced fulcrum supports on said under frame defining at the dumping side of the car a stationary fulcrum axis around which the latter portion of the dumping movement of the bed occurs, side gates pivotally connected adjacent to their lower edges with said bed to swing downwardly into open position, and gravity held locking means for each gate comprising outer link means operatively associated with the respective gate. and inner link means pivotally connected with said outer link means and with the car.

44. A dump car comprising an under body, a car bed mounted on said under body and adapted to tilt to dumping position at either side of the car about rocker fulcrums spaced laterally from the longitudinal center of said under body, side gates connected with opposite sides of said bed and adapted to swing outward and downward from their closed positions, and controlling mechanism for each gate comprising a member supported independently of the under body and pivotally connected with the bed to swing therewith at the rising side of the bed, means on the under body at the dumping side thereof engaged by said member to hold the outer end thereof substantially stationary in the dumping operation, and means effective between the outer end of said member and the adjacent gate for controlling said gate.

45. A dump car comprising an under body, a car bed mounted on said under body and adapted to rock to dumping position at either side of the car, supporting means on which said bed tilts including laterally spaced fulcrums fixedly secured to said bed, side gates pivotally connected adjacent to their lower edges to said bed to swing outward and downward from their closed position, and toggle devices supported independently of the under body, and pivotally connected with the bed and adapted to swing therewith for holding the gate at the high side closed during dumping.

46. A dump car comprising a bed adapted to tilt laterally in either direction from its normal position, an under body, laterally spaced fulcrums fixedly secured to said bed, laterally spaced stationary fulcrum supports on said under body, side gates for said bed connected thereto to swing outward and downward from their closed positions, and separate toggle means for controlling each gate supported independently of the under body and having the outer end portion thereof connected to swing upward with the bed for holding the gate at the high side closed during tilting.

47. A dump car comprising a bed adapted to tilt laterally in either direction from its normal position, an under body, laterally spaced fulcrums on said bed, laterally spaced stationary fulcrum supports on said under body, each of said lateral fulcrums in its rocking movement on the cooperating lateral fulcrum support being held against lateral motion relatively to the under body, side gates for said bed mounted to swing outward and downward from their closed positions, and a separate toggle mechanism for controlling each gate pivotally supported on the bed and adapted to have operative connection with the under body solely on that side thereof on which its gate is disposed.

48. In a dump vehicle, a frame, a dump body tiltable for dumping at either side of the vehicle, laterally spaced fulcrum members on said body and frame about which said body tilts, downfolding side doors pivoted to said body at each side thereof, gravity held locking means connected to said body and the respective door to hold said door closed while the body has been tilted about the fulcrum on the side opposite said door, and means on the frame to release said holding means when the body turns about the fulcrum at the side adjacent said door.

49. In a dump vehicle, a frame, a dump body tiltable for dumping at either side about rocking fulcrums spaced laterally from the center of said under frame, downfolding side doors pivoted to said body at each side thereof, gravity held locking means pivotally connected to said body and the respective door to hold said door closed while the body has been tilted about the fulcrum on the side opposite said door, and means on the frame to release said holding means when the body turns about the fulcrum at the side adjacent said door.

50. In a dump vehicle, a frame, a dump body tiltable for dumping at either side about fulcrums on said frame spaced laterally from the longitudinal center thereof, downfolding side doors pivoted to said body at each side thereof, gravity held toggle means connected to said body and the respective door to hold said door closed while the body has been tilted about the fulcrum on the side opposite said door, and means on the frame to release said toggle means to permit the door at the dumping side of the body to open.

51. In a dump vehicle, a frame, a dump body tiltable for dumping at either side, laterally spaced fulcrums on said dump body, laterally spaced stationary fulcrum supports on said frame cooperating with said laterally spaced fulcrums, the lateral fulcrum support at the dumping side of the vehicle operating to hold its cooperating fulcrum against lateral motion relatively to said frame in the tilting movement of said fulcrum on said support, down folding side doors pivoted to said body at each side thereof, gravity held locking means connected to said body and the respective door to hold said door closed while the body has been tilted about the fulcrums on the side opposite said door, and means on the frame at the dumping side thereof to release said holding means to permit the door at the dumping side of the body to open.

52. A dump car comprising an underframe, a dumping bed, fulcrums on said underframe spaced laterally from the longitudinal center thereof, said bed being tiltable for dumping at either side about said laterally spaced fulcrums, down-folding side gates pivoted to said bed at each side thereof, toggles adapted to hold said gates closed, and toggle breaking means independent of said toggles, operating to break said toggles to permit the gate at the dumping side to open upon the tilting of the bed to discharge its load at either side of the car, the toggle on the rising side of the bed being caused to separate automatically from its toggle breaking means solely by the tilting motion of the bed.

53. A dump car comprising an underframe, a bed, fulcrums on said underframe spaced laterally from the longitudinal center thereof, said bed tiltable for dumping at either side about said fulcrums, downfolding side gates pivoted to said bed at each side thereof, toggles adapted to hold said gates closed, and means supported solely on the underframe operating to break said toggles to permit the gate at the dumping side to open upon the tilting of the bed to discharge its load at either side of the car.

54. A dump car comprising an underframe, a bed adapted to tilt about laterally spaced fulcrums relative to said underframe, side gates for said bed mounted to swing outward and downward from their closed position, toggles adapted to hold said gates closed when they are moved upward from their normal position, and means mounted on the underbody at opposite sides of the car and independent of the toggles operating to break said toggles to permit the gate at the dumping side to open upon the tilting of the bed in either direction.

55. A dump car comprising an underframe, a bed tiltable for dumping at either side about fulcrums on said underframe spaced laterally from the longitudinal center thereof, side gates for said bed mounted to swing outward and downward from their closed position, toggles adapted to hold said gates closed, and means operating to break said toggles to permit the gate at the dumping side to open upon the tilting of the bed to discharge its load at either side of the car, said toggles being arranged to swing upward from their normal position independently of said toggle breaking means.

56. A dump car comprising a bed adapted to tilt laterally in either direction from its normal position, an underbody, laterally spaced fulcrums for said bed, laterally spaced stationary fulcrum supports on said underbody cooperating with said laterally spaced fulcrums, the lateral fulcrum support at the dumping side of the car operating to hold its cooperating fulcrum against lateral motion relatively to the underbody in the rocking movement of said fulcrum on said support, side gates for said bed mounted to swing outward and downward from closed positions, and a separate gate controlling mechanism for each gate adapted to have operative connection with the underbody solely at that side thereof on which the gate is disposed, the gate controlling mechanism associated with the gate at the rising side of the bed positively holding said gate closed in the tilting of the bed to dumping position.

57. A dump car comprising a bed adapted to tilt laterally in either direction from its normal position, an underbody, laterally spaced fulcrums on said bed, laterally spaced stationary fulcrum supports on said underbody, the lateral fulcrum support at the dumping side of the car operating to hold its cooperating fulcrum against lateral motion relatively to the underbody in the rocking movement of said fulcrum on said support, side gates for said bed mounted to swing outward and downward from their closed positions, and a separate gate controlling mechanism for each gate pivotally supported on the bed and adapted to have operative connection with the underbody solely at that side thereof on which the gate is disposed, each gate controlling mechanism comprising means whereby in the tilting of the bed toward dumping position the gate at the rising side is positively held closed against dumping of the load and the gate at the dumping side is automatically permitted to open with a gradual movement and is positively moved to closed position when the bed is righted.

58. A dump car comprising an underbody, a car bed mounted on said underbody and adapted to tilt to dumping position at either side of the car about rocker fulcrums spaced laterally from the longitudinal center of said underbody, side gates connected with opposite sides of said bed and adapted to swing outward and downward from their closed positions, and gate controlling mechanism comprising means carried by the bed and movable by the tilting thereof into and out of automatic locking engagement with the underbody, the gate controlling mechanism associated with the gate at the rising side of the bed positively holding said gate closed in the tilting of the bed to dumping position.

JOSEPH H. SLAKER.